US010970696B1

(12) United States Patent
Shah et al.

(10) Patent No.: US 10,970,696 B1
(45) Date of Patent: Apr. 6, 2021

(54) TECHNIQUES TO PROVIDE PHYSICAL TRANSACTION CARD CAPABILITIES FOR A MOBILE DEVICE

(71) Applicant: Capital One Services, LLC, McLean, VA (US)

(72) Inventors: Salik Shah, Washington, DC (US); Sophie Bermudez, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/592,961

(22) Filed: Oct. 4, 2019

(51) Int. Cl.
*G06Q 20/20* (2012.01)
*G06K 7/10* (2006.01)
*G06F 3/0488* (2013.01)
*H04B 5/00* (2006.01)
*H04B 1/3888* (2015.01)
*G06Q 20/10* (2012.01)

(52) U.S. Cl.
CPC ....... *G06Q 20/204* (2013.01); *G06F 3/04883* (2013.01); *G06K 7/10297* (2013.01); *G06Q 20/1085* (2013.01); *H04B 1/3888* (2013.01); *H04B 5/0031* (2013.01)

(58) Field of Classification Search
CPC ............. G06Q 20/3278; G06Q 20/352; G06Q 20/322; G06Q 20/34
See application file for complete search history.

(56) References Cited

U.S. PATENT DOCUMENTS

| 7,059,520 B1 | 6/2006 | Shtesl | |
|---|---|---|---|
| 7,543,156 B2* | 6/2009 | Campisi | G07F 7/086 |
| | | | 713/186 |
| 7,597,250 B2* | 10/2009 | Finn | G06K 19/07732 |
| | | | 235/380 |
| 7,949,373 B2* | 5/2011 | Whiting | G06K 19/06187 |
| | | | 455/557 |
| 7,980,458 B2* | 7/2011 | Kon | G06Q 20/042 |
| | | | 235/375 |
| 9,269,083 B1 | 2/2016 | Jarajapu et al. | |
| 9,734,345 B2 | 8/2017 | Spodak et al. | |
| 9,838,520 B2* | 12/2017 | Goodman | H04M 1/21 |
| 10,628,820 B2* | 4/2020 | Wyatt | G06Q 20/352 |
| 2002/0073025 A1 | 6/2002 | Tanner et al. | |
| 2003/0004876 A1* | 1/2003 | Jacobson | H04M 17/026 |
| | | | 705/41 |
| 2006/0219776 A1* | 10/2006 | Finn | G06K 19/07732 |
| | | | 235/380 |
| 2008/0126260 A1* | 5/2008 | Cox | G06Q 20/20 |
| | | | 705/67 |
| 2008/0314971 A1* | 12/2008 | Faith | G06Q 20/32 |
| | | | 235/379 |
| 2009/0050689 A1* | 2/2009 | Sako | G06Q 20/3278 |
| | | | 235/375 |

(Continued)

*Primary Examiner* — Peter Ludwig
(74) *Attorney, Agent, or Firm* — Kacvinsky Daisak Bluni PLLC

(57) ABSTRACT

Various embodiments are generally directed to techniques to enable use of a transaction card of a user device to perform transactions. Embodiments may include method, techniques, and circuitry to cause a transaction card to extend from a user device to be used to perform the transactions. Further, the transaction card may retract into the housing the user device when not in use.

20 Claims, 9 Drawing Sheets

(56) References Cited

U.S. PATENT DOCUMENTS

| | | | |
|---|---|---|---|
| 2009/0066478 A1* | 3/2009 | Colella | G06Q 10/06 340/5.83 |
| 2012/0067473 A1* | 3/2012 | Khounsombath | A45C 1/06 150/147 |
| 2013/0191279 A1* | 7/2013 | Calman | G06Q 20/3226 705/41 |
| 2013/0341412 A1* | 12/2013 | Johnson | F16B 47/00 235/492 |
| 2014/0339315 A1* | 11/2014 | Ko | G06Q 20/3227 235/492 |
| 2016/0019531 A1* | 1/2016 | Gormley | G06Q 20/405 705/72 |
| 2016/0019548 A1* | 1/2016 | Gangi | G06F 21/32 705/72 |
| 2016/0206062 A1* | 7/2016 | Marvin | A45C 11/00 |
| 2016/0267486 A1* | 9/2016 | Mitra | H04W 12/041 |
| 2018/0033013 A1* | 2/2018 | Park | G06Q 20/325 |
| 2018/0068300 A1* | 3/2018 | Saeed | G07F 7/0886 |
| 2018/0278730 A1* | 9/2018 | Saeed | G06Q 20/322 |
| 2019/0180257 A1* | 6/2019 | Lee | G06Q 20/105 |
| 2019/0272363 A1* | 9/2019 | Suwald | G06F 21/33 |
| 2019/0286805 A1* | 9/2019 | Law | G06F 21/32 |

* cited by examiner

FIG. 3A

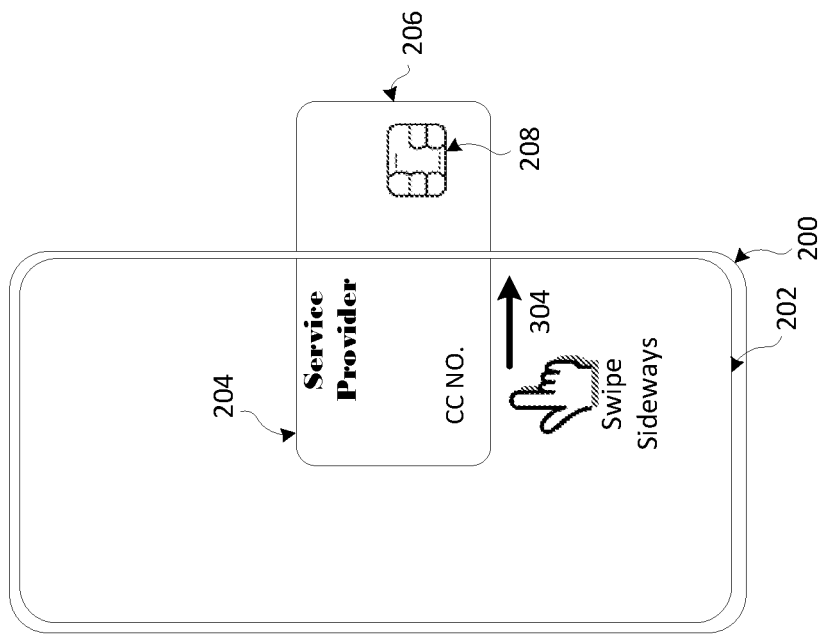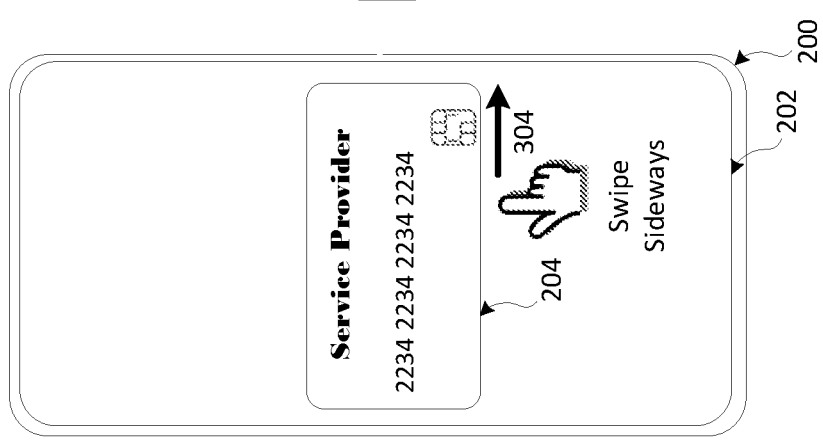
FIG. 3B

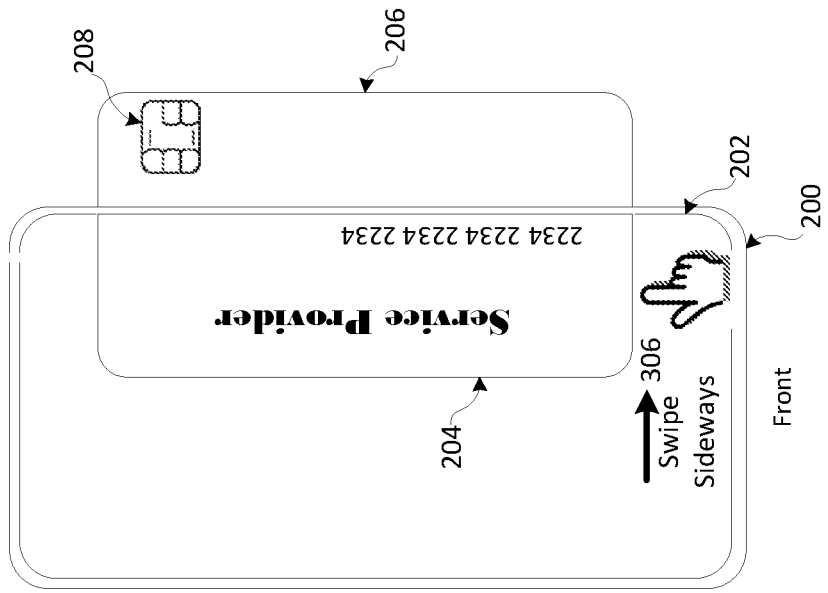
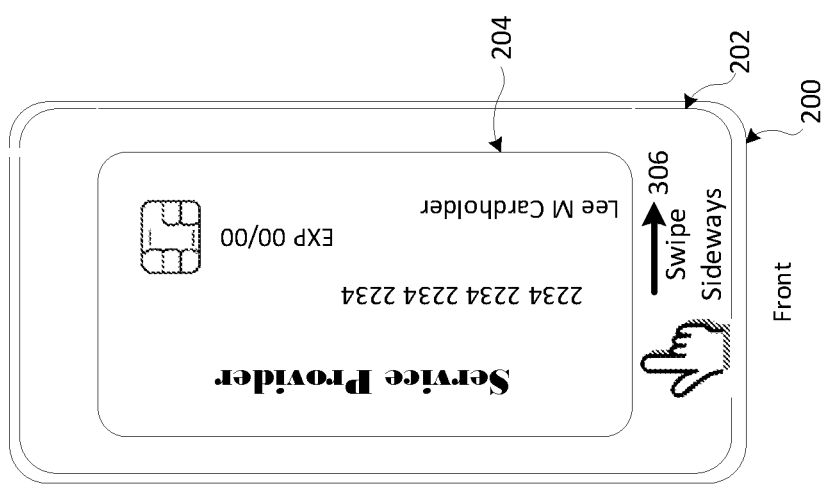
FIG. 3C

400

DETECT AN EVENT TO EXTEND A SUBSTRATE FROM AN EDGE OF A HOUSING OF A USER DEVICE
405

DETERMINE THE SUBSTRATE IS RETRACTED FROM THE EDGE OF THE HOUSING

410

CAUSE THE SUBSTRATE TO EXTEND FROM THE EDGE OF THE HOUSING
415

DETECT ANOTHER EVENT TO RETRACT THE SUBSTRATE FROM THE EDGE OF THE HOUSING OF THE USER DEVICE
420

CAUSE RETRACTION OF THE SUBSTRATE FROM THE EDGE OF THE HOUSING SUCH THAT THE SUBSTRATE IS WITHIN THE HOUSING

```
┌─────────────────────────────────────────────────────────┐
│ DETERMINE TO EXTEND A SUBSTRATE FROM AN EDGE OF A HOUSING OF │
│    USER DEVICE BASED ON A DETECTION OF AN EVENT         │
│                                                         │
│                          505                            │
└─────────────────────────────────────────────────────────┘
                             │
┌─────────────────────────────────────────────────────────┐
│  DETERMINE WHETHER THE SUBSTRATE IS RETRACTED FROM THE EDGE │
│   OF THE HOUSING OR EXTENDED FROM THE EDGE OF THE HOUSING │
│                                                         │
│                          510                            │
└─────────────────────────────────────────────────────────┘
                             │
┌─────────────────────────────────────────────────────────┐
│ IN RESPONSE TO DETERMINING THE SUBSTRATE IS RETRACTED FROM THE │
│  EDGE OF THE HOUSING, CAUSE THE SUBSTRATE TO EXTEND FROM THE │
│  EDGE OF THE HOUSING BASED ON THE SUBSTRATE DETERMINED TO BE │
│                       RETRACTED                         │
│                          515                            │
└─────────────────────────────────────────────────────────┘
                             │
┌─────────────────────────────────────────────────────────┐
│ IN RESPONSE TO DETERMINING THE SUBSTRATE IS EXTENDED FROM THE │
│ EDGE OF THE HOUSING, MAINTAINING THE SUBSTRATE EXTENDED UNTIL │
│    THE DETECTION OF ANOTHER TO RETRACT THE SUBSTRATE    │
│                                                         │
│                          520                            │
└─────────────────────────────────────────────────────────┘
                             │
┌─────────────────────────────────────────────────────────┐
│ DETECTING THE ANOTHER EVENT TO RETRACT THE SUBSTRATE FROM THE │
│         EDGE OF THE HOUSING OF THE USER DEVICE          │
│                                                         │
│                          525                            │
└─────────────────────────────────────────────────────────┘
                             │
┌─────────────────────────────────────────────────────────┐
│  CAUSING RETRACTION OF THE SUBSTRATE FROM THE EDGE OF THE │
│   HOUSING SUCH THAT THE SUBSTRATE IS WITHIN THE HOUSING │
│                                                         │
│                          530                            │
└─────────────────────────────────────────────────────────┘
```

TECHNIQUES TO PROVIDE PHYSICAL TRANSACTION CARD CAPABILITIES FOR A MOBILE DEVICE

BACKGROUND

People carry many types of cards with them every day to perform day-to-day activities. The cards may include credit cards, debit cards, drivers' licenses, transportation passes, building access cards, and many other types of cards. Since people do not know which of the cards will be needed on any given day, most people carry all the cards that they may need with them every day. With the proliferation of card-capable terminals, people can end up carrying an inordinate number of cards with them every day. These cards are typically carried in a wallet or purse, making the wallet or purse big, bulky, and heavy.

SUMMARY

Various embodiments described herein may include one or more devices, apparatuses, systems, components, and so forth to perform the operations detecting an event to extend a substrate from an edge of a housing of a user device, the substrate comprising a magnetic stripe having information for an account for performance of a transaction, and the substrate coupled with the housing, determining the substrate is retracted from the edge of the housing, and causing the substrate to extend from the edge of the housing based on the substrate determined to be retracted. Embodiments also include detecting another event to retract the substrate from the edge of the housing of the user device, and causing retraction of the substrate from the edge of the housing such that the substrate is within the housing.

Various embodiments may also include determining to extend a substrate from an edge of a housing of user device based on a detection of an event, the substrate comprising a magnetic stripe having information for an account for performance of a transaction, and the substrate coupled with the housing, determining whether the substrate is retracted from the edge of the housing or extended from the edge of the housing. In response to determining the substrate is retracted from the edge of the housing, cause the substrate to extend from the edge of the housing based on the substrate determined to be retracted, and in response to determining the substrate is extended from the edge of the housing, maintaining the substrate extended until the detection of another to retract the substrate. Embodiments also include detecting the another event to retract the substrate from the edge of the housing of the user device, and causing retraction of the substrate from the edge of the housing such that the substrate is within the housing.

Various embodiments may also include a user device, further having a housing with a front portion, a back portion, and edges to couple the front portion with the back portion. The device may also include a substrate coupled with the housing, the substrate includes a magnetic stripe, and the magnetic stripe is programmable to store information associated with at least one account of a plurality of accounts. The device includes substrate controller circuitry located within the housing and coupled with the substrate, the substrate controller circuitry is operable to execute instructions to control the substrate. For example, the substrate controller circuitry, when executing the instruction, detect an event to cause at least a portion of the substrate to extend from an edge of the housing, wherein the portion of the substrate comprises the magnetic stripe, and cause the portion of the substrate to extend from the edge of the housing.

BRIEF DESCRIPTION OF THE DRAWINGS

FIG. 3A illustrates a first example of a sequence flow of a user device based on an event.

FIG. 3B illustrates a second example of a sequence flow of a user device based on an event.

FIG. 3C illustrates a third example of a sequence flow of a user device based on an event.

FIG. 4 illustrates a first example of a logic flow diagram.

FIG. 5 illustrates a second example of a logic flow diagram.

DETAILED DESCRIPTION

Figure 1:
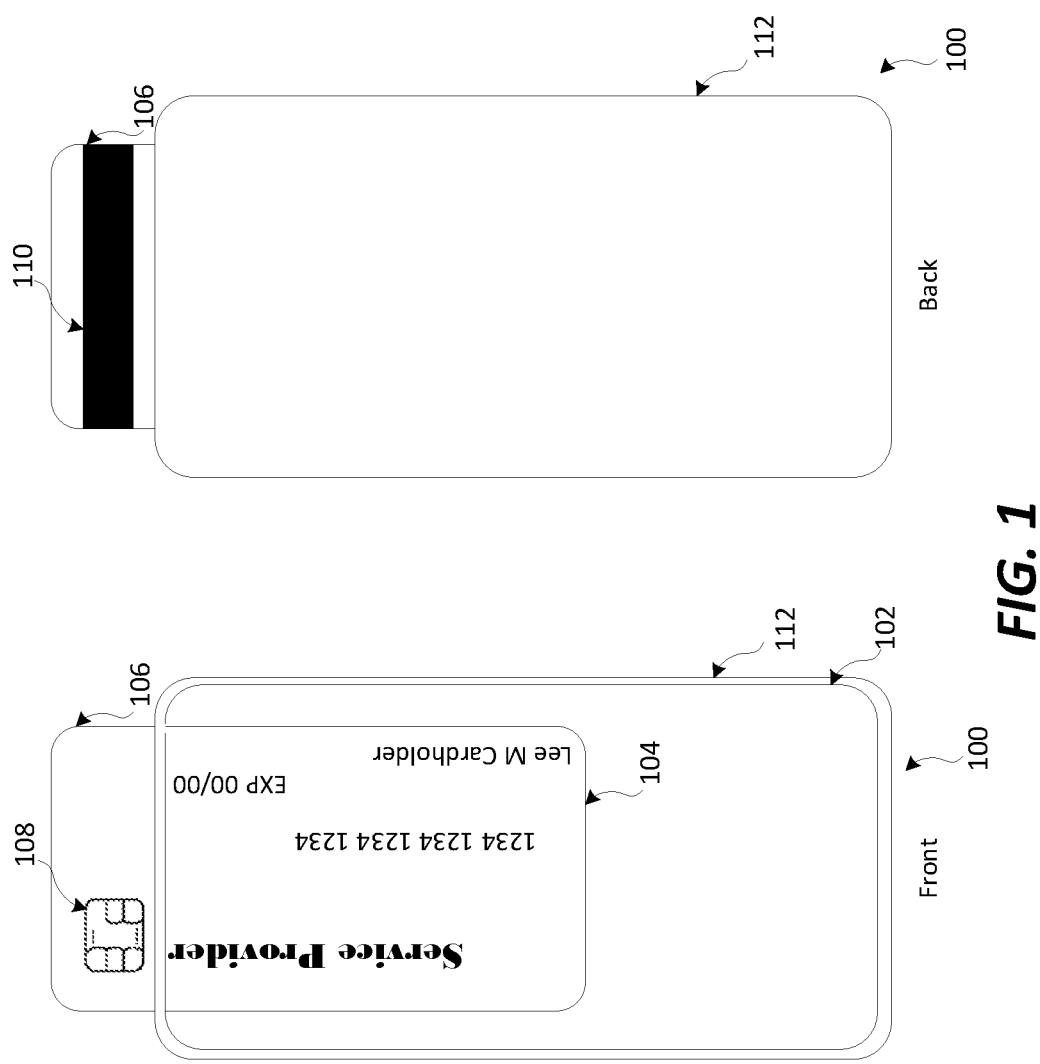
FIG. 1 illustrates a first example configuration of user device with a transaction card.

Various embodiments are generally directed to techniques to enable physical transaction card capabilities for a user device, such as a mobile phone device or mobile device. More specifically, embodiments may include a user device coupled with at least a portion of a physical transaction card including transaction card components that may be extended and/or made available for use to conduct a transaction. The portion of the transaction card may be made of a substrate including one or more transaction card components, such as an Europay, Mastercard, Visa (EMV) chip, a magnetic stripe, and so forth. The transaction card and/or portion thereof may be stored within a housing of the user device and/or be coupled with the housing of the user device such that when it is not in an extended state, it does not extend or protrude from any edge of the housing of the user device.

Further, the user device may include a mechanism, such as a substrate device, to cause the portion of the transaction card to extend from at least one side of the housing such that at least one of the components may be used in a point-of-sale (POS) terminal. For example, the portion of the transaction card may include an EMV chip that when extended from an edge of the housing may be inserted into a POS terminal to perform a transaction. Similarly and in another example, the portion of the transaction card may include a magnetic stripe that when extended from an edge of the housing may be inserted and/or swiped through a card reader of transaction terminal to perform a transaction.

In some instances, the user device, including the mechanism, may extend and/or cause extension of the portion of the transaction card based on the occurrence of event. For example, the user device may include an application including one or more instructions that may receive and/or detect a user input, such as a swipe gesture on a touchscreen interface, that may cause the portion of the transaction card to extend from an edge of the user device. In some instances, the portion of the transaction card may extend from the edge of the user device in the direction of the swipe, e.g., from a right edge when the swipe is from left to right. However, embodiments are not limited in this manner; for example, in other instances, the portion of the transaction card may extend from an edge of the housing in the opposite direction.

The direction of extension of the portion of the transaction card may be programmable and/or configurable by a user of the user device.

In another example, the event to cause extension of the portion of the transaction card may be a detection of near-field communication (NFC) signal. For example, the user device, including the application and one or more instructions, may receive/detect an indication of an NFC signal. The user device may communicate one or more signals with another device via an NFC protocol to establish a communication link with another device. The user device, including the application, may determine another device is a POS terminal to perform a transaction. Based on the detection of the NFC signal and/or verification of the POS terminal, the user device may cause the portion of the transaction card to extend from an edge of the user device. In some instances, the user device may first attempt to perform the transaction with another device via one or more NFC communications, and if the attempt(s) fail, may then cause the portion of the transaction card to extend. Thus, in this example, the portion of the transaction card may be used as a fallback mechanism to perform a transaction if the transaction fails via NFC. These and other details will become more apparent in the following description.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modification, equivalents, and alternatives within the scope of the claims.

FIG. 1 illustrates a first example configuration of a user device 100 with a transaction card 114. The mobile device 100 may be any type of user devices, such as a mobile phone device, a personal digital assistant (PDA) device, a cellular telephone device, and the like. Embodiments are not limited in this manner, e.g., the user device 100 may be another type of device such a wearable device, a device within a purse or wallet, and so forth.

Figure 6:
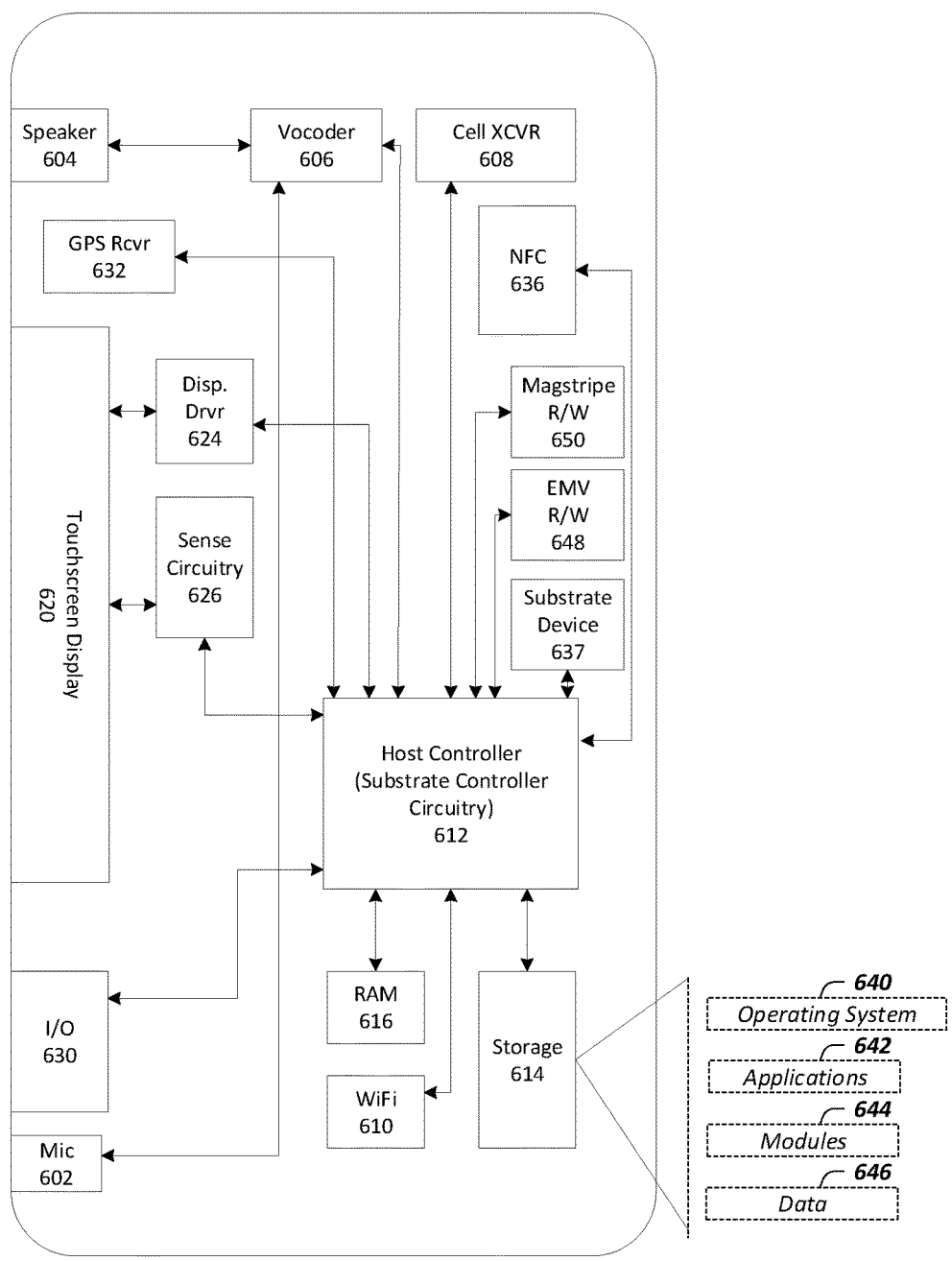
FIG. 6 illustrates an example of a user device system.

As similarly discussed in FIG. 6 in more detail, the user device 100 may have a number of components to process data and information and perform the operations discussed herein, including memory and substrate controller circuitry to cause at least a portion of a transaction card to extend from at least one edge of the user device 100.

The user device 100 may include a housing 112 to enclose the one or more components and may be coupled with at least a portion of the transaction card 114. The housing 112 may be any type of housing made of a material such as synthetic substance like an Acrylonitrile Butadiene Styrene (ABS), Polycarbonate (PC), and other polymers, or a metal such as an aluminum alloy.

The user device 100 may also include a display 102, which may be coupled with and/or embedded in the housing of the 112. The display 102 may be any such as a liquid crystal display (LCD) including a touch interface capable of detecting user interactions. For example, the display device 012 may include the touch interface layered on the top of the display to detect a touch input. A user can provide inputs or control a single or multi-touch gestures by touching the screen (touch interface) with a stylus, one or more fingers, and so forth. For example, user may make one or more gestures, such as a swipe, that may be detected by the touch interface and provided to an application including instructions to cause a portion of a transaction card 106 to extend. In some instances, the opposite may occur. For example, a user may make one or gestures, such as a swipe in an opposite direction, that may be detected by the touch interface and provided to the application including instructions to cause the portion of the transaction card 106 to retract. Further, the display device 102 including the touch interface may be implemented in any touch detecting technology, such as resistive, capacitive, infrared, optical, etc., and embodiments are not limited in this manner.

In embodiments, the display device 102 can display information and data in a graphical user interface (GUI), which a user may interact with to perform operations discussed herein. In one example, the display device 102 can display a GUI generated by the application, including instructions to interact with the transaction card and to make transactions. The application may be an electronic commerce (e-commerce) application, a banking application, a web browser application, and so forth. The GUI may be utilized to perform transactions, e.g., shop on a website, enter account information, enter personal information, and so forth.

In some embodiments, the display 102 may display a graphical representation 104 of a transaction card presented in the GUI and enable a user to interact with the graphical representation 104. For example, the application may enable a user to select a transaction card and then cause the presentation of a graphical representation 104 of the selected transaction card in the GUI. A user may then interact with the graphical representation 104 of the selected transaction card via the display 102 including the touchscreen interface. For example, the user may make one or more input gestures that may cause at least a portion of the physical transaction card 106 to extend and/or retract from an edge of the user device 100. As mentioned, as swipe detected by the touchscreen interface may cause the portion of the transaction card 106 to extend and a swipe in an opposing direction may cause the portion of the transaction card 106 to retract.

In some instances, the display 102 may update, via the application, the display of the transaction card as it is being extended and retracted. For example, as the portion of the transaction card 106 is being extended, the display 102 may show the graphical representation 104 moving in the GUI in the direction the portion of the physical transaction card 106 is being extended and may correspond to the portion of the card not extended, e.g., the graphical representation 104 of the card.

In embodiments, a user may make a selection of a graphical representation of a transaction card from a plurality of transaction cards, and the user device 100 may cause programming of one or more of the EMV chip and/or magnetic stripe 110 with transaction information associated with the selected transaction card. The transaction card may include an account number, user information, expiration date information, and so forth related to the selected transaction card. The user device 100 may cause programming by sending one or more signals to the EMV chip reader/writer and/or magnetic stripe reader/writer to cause the device(s) to program the chip and/or stripe. The instructions may be instructions to cause one of the devices to write to the EMV chip and/or stripe, for example. The instructions may also include the information to program on the chip and/or stripe, which may be stored and retrieved from a secure memory location.

As illustrated in FIG. 1, the user device 100 includes a physical portion of a transaction card 104 extended from an upper edge of the user device 100. In the illustrated example, the portion of the physical transaction card that is not extended is illustrated as the graphical representation 104 of the transaction card. Although not illustrated in FIG. 1, when the transaction card is in a retracted position, the entire transaction card may be represented on the display 102 of the user device 100.

In some embodiments, the graphical representation 104 of the transaction card may display information of the account of the transaction card, e.g., name, account number, bank issuer, expiration date, etc. This information may be utilized by a POS terminal attendant to verify the user of the transaction card, for example. Further, the extended portion of the transaction card 106 may include one or more components to perform the transaction, such as an EMV chip 108 and a magnetic stripe 110. In the illustrated example, the EMV chip 108 may be located on a front side of the portion of the transaction card 106 extended, and the magnetic stripe 110 may be located on a back side of the transaction card 106. The front side of the transaction card 106 may correspond may be the same side of the user device 100 having the display and the back side of the transaction card 106 may be the backside of the user device 100. Note that embodiments are not limited to the position of the components on the portion of the transaction card 106. The components may be located in different locations as long as they may be utilized for their intended use, e.g., the EMV chip 108 inserted into a POS terminal in accordance with the EMV standard, and the magnetic stripe 110 capable of being swiped through a magnetic stripe reader.

In embodiments, the transaction card 106 may include a substrate on which the components may be embedded or placed. The substrate may include a single layer or one or more laminated layers composed of plastics, metals, and other materials. Example substrate materials include polyvinyl chloride, polyvinyl chloride acetate, acrylonitrile butadiene styrene, polycarbonate, polyesters, anodized titanium, palladium, gold, carbon, paper, and biodegradable materials. In some instances, the substrate may be made of a metal, such as an aluminum alloy. Embodiments are not limited in this manner.

In embodiments, the user device 100 is capable of programming and configuring the one or more components of the physical portion of the transaction card 104. The user device 100 may include an EMV chip reader/writer (not shown) that may be capable of programming the EMV chip 108 of the transaction card 106 when the transaction card 106 is in a retracted state, for example. The user device 100 may include the EMV reader/writer in a body of the housing 112 such that when the transaction card 104 is in the retracted state a contact pad of the EMV reader/writer may physically and/or electrically coupled with the contact pad of the EMV chip 108. In one example, the transaction card 106 may slide within the body of the housing 112 into a slot of the user device 100 and the EMV reader/writer may be located within the slot on the body of the housing 112 such that its' contact pads coupled with the contact pads of the transaction card 104. In another example, the transaction card may retract and/or 'flip' into a recess portion of the body of the housing 112 of the user device 100, e.g., within a recess on the backside of the user device 100. In this example, the EMV reader/writer may include a contact pad within the recess portion of the body of the housing 112 of the user device 100 that it aligns with the contact pad of the transaction card 106 when it is retracted.

In embodiments, the user device 100 may also include a magnetic stripe reader/writer (not shown) that may be able to read and write to the magnetic stripe 110 of the transaction card 106. Similarly, the magnetic stripe reader/writer may be located within a slot of the housing 112 of the user device 100 and may include one or more reading/writing heads to couple with the magnetic stripe 110 of the transaction card 106 when it is a retracted state. The magnetic stripe reader/writer may also be within a recess of the housing 112 of the user device 100 if the transaction card 106 retracts into a recess. Embodiments are not limited in this manner.

In embodiments and although not shown in FIG. 1, a user device 100 may include one or more electrical, mechanical, and/or electro-mechanical devices, i.e., a substrate device, capable of extending and retracting the transaction card 106 from an the edge of the user device 100. The substrate device may include but is not limited, a motor, a switch, an actuator, a servomechanism, a positioning device, electronics, a controller, a solenoid, and so forth. In embodiments, the device(s) may be located within the housing 112 the user device 100 and be electrically/physically coupled with a host controller, such as a substrate controller circuitry, to receive and send signals to extend and retract the transaction card 106. For example and as will discussed in more detail in FIG. 6, the user device 100 may include a controller/processor capable of processing information and data to perform the operations discussed herein. In one specific example, a controller may receive a signal based on user input, e.g., detection of an event, to cause extension of the transaction card 106. The controller may further generate and communicate one or more other signals that may cause and/or control the device to extend the transaction card 106. In another example, the controller may receive a signal based on an event to cause the transaction card 106 to retract. The controller may further generate one or more signals to communicate with the device to retract the transaction card 106.

In embodiments, the user device 100 may include one or more devices to enable the transaction card 106 to be extended and/or retracted from an edge of the housing 112 of the user device 100. For example, the user device 100 may include a mechanical slot in which the transaction card 106 may slide into and out. The slot may include a mechanism to be pushed or pulled, a tray. The mechanism may be controlled via the electromechanical device(s), as previously discussed, and the controller of the user device 100. In embodiments, the mechanism may include other mechanical structures, such as springs, rails, wheels, clips, etc. and be designed to enable extension and retraction of the transaction card 106. Thus, the transaction card 106 may be pushed out of the slot to extend from the edge of the user device 100 and/or pulled/slide into the slot to retract into the user device 100. In another example, the user device 100 may include a spring mechanism that may be controlled by the electromechanical device to cause the transaction card 106 to spring and/or flip from a recess portion of the back of the user device.

In embodiments, the user device 100, including the application, may cause the extension and/or retraction of the transaction card 106 based one or more events. For example and as previously discussed, an event may be a gesture in a swiping motion on a touchscreen interface that may cause the transaction card 106 to extend from an edge of the user device 100. In another example, the even may be a gesture in swiping motion on the touchscreen interface that may cause the transaction to 106 to retract from an edge of the user device 100. However, embodiments are not limited in this manner.

For example, the event may be a detection by the application and the user device 100 of a failure to perform a transaction via an NFC device. More specifically, the user device 100 may include an NFC device that may be used to complete transactions via NFC communications with a POS terminal. In some instances, for whatever reason, the transaction may fail, e.g., NFC link may not be established, the user may not be verified, NFC device error, etc. In these instances, the event may be the failure of the transaction via NFC, and the user device 100 and application may cause the transaction card 106 to extend based on the detection. Similarly, the event may be the detection of completion of a transaction via one of the components of the transaction card 106 and may retract the transaction card 106. Other events that may include extension and/or retraction of the transaction card 106 may include a signal emitted by a POS terminal and detected by the user device 100, e.g., NFC signal, 802.11 signal, Bluetooth signal, etc. An event may include a user input, a communication from a banking system, a communication from a mobile device, and so forth. Embodiments are not limited in this manner.

In embodiments, the user device 100 may extend and retract the transaction card 106 from any edge of the user device 100. For example, FIG. 1 illustrates the transaction card 106 from the top edge of the user device 100. However, embodiments are not limited in this manner. For example, in some instances, the transaction card 106 may extend and retract from a bottom edge of the user device 100.

Figure 2A:
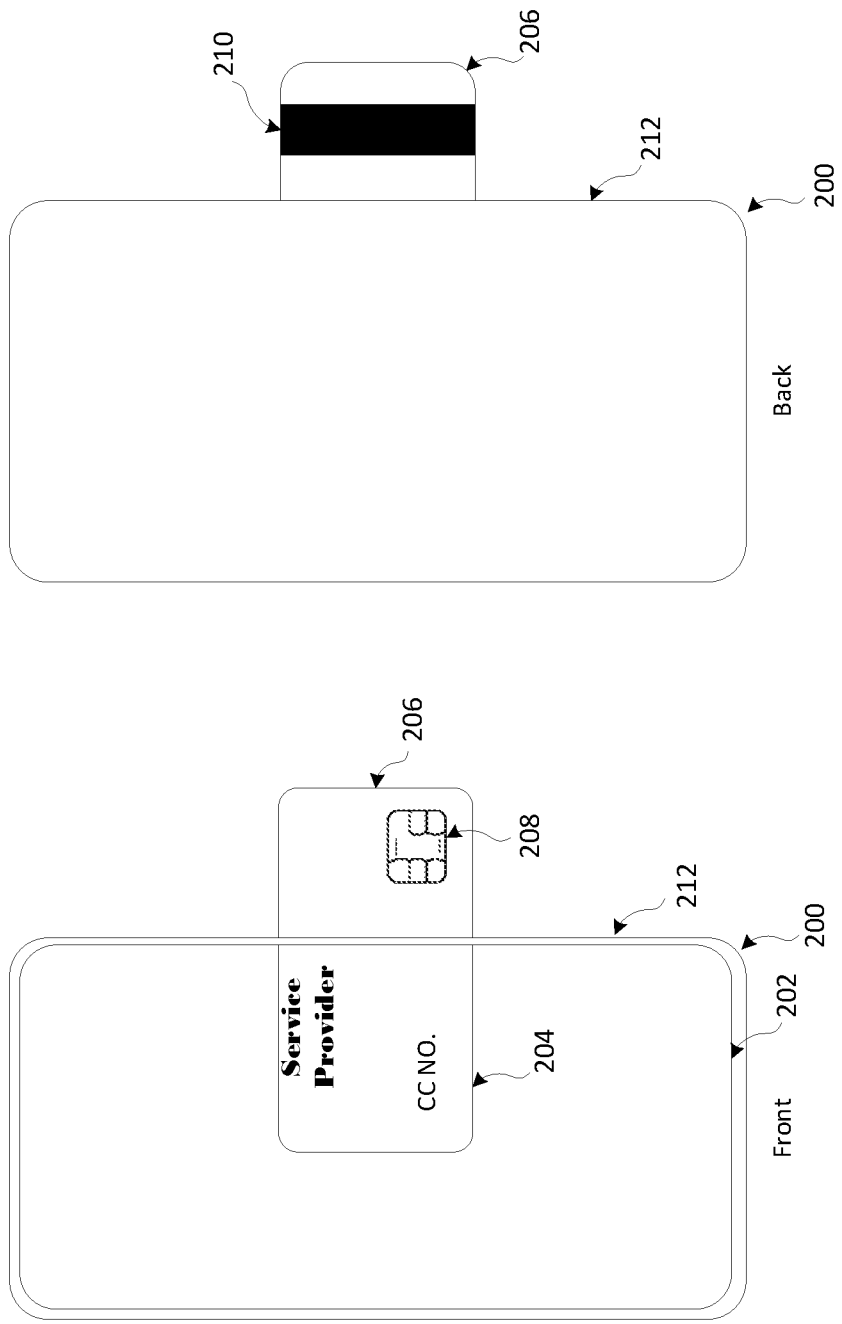
FIG. 2A illustrates a second example configuration of a user device with a transaction card.

FIGS. 2A/2B illustrate additional configurations where the transaction card 206 extends and retracts from the side edge of the transaction card 200. Moreover, the transaction card 206 may extend and retract in a different orientation— for example, FIG. 2A illustrates the user device 200 with the transaction card 206 extended from the edge 212, e.g., right side edge of the user device 200 in a 'landscape' orientation, e.g., where the top and bottom edges are longer than the side edges. As similarly discussed in FIG. 1, the user device 200 may display a graphical representation 204 of the transaction card 206 on the display 202 of the user device 200, e.g., in a GUI. The transaction card 206 may also include one or more components, such as an EMV chip 208 and magnetic stripe 210 that may be extended from the side edge of the user device 200. The one or more components may be positioned such that they may be used at a POS terminal, e.g., inserted or swiped through the POS terminal.

Figure 2B:
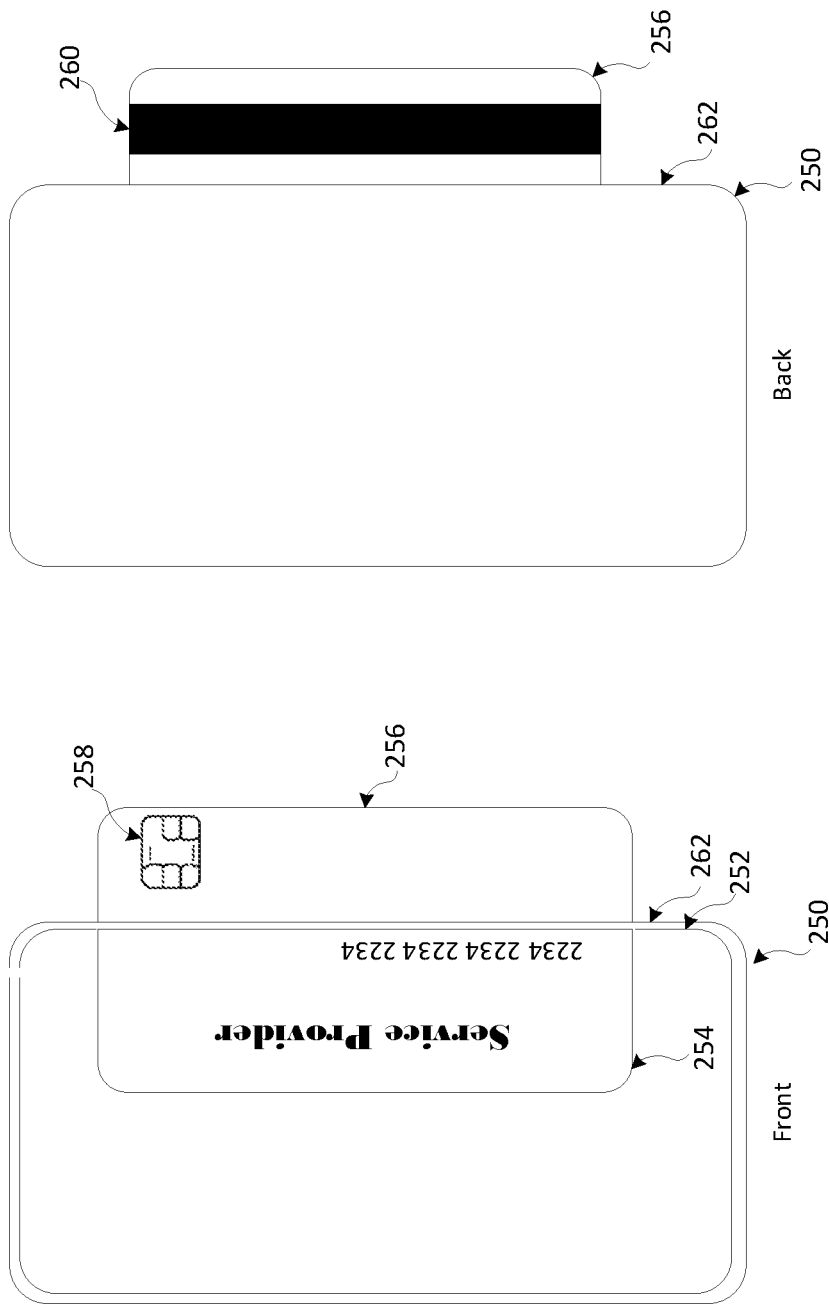
FIG. 2B illustrates a third example configuration of a user device with a transaction card.

FIG. 2B is similar to FIG. 2A, however, the transaction card 256 is in a portrait orientation, e.g., where the top and bottom edges are shorter than the side edges. Similar to FIGS. 1 and 2A, the user device 250 includes a display 252 that may present or display a graphical representation 254 of a transaction card. The graphical representation may display information relating to the transaction card, e.g., account number, user name, account provider, expiration date, and so forth.

In embodiments, the portion of the transaction card 256 extended from the edge 262 user device 250 may also include one or more components including the EMV chip 258 and the magnetic stripe 260. The EMV chip 258 and magnetic stripe 260 may be positioned on the transaction card 256 such that it may be inserted into or swiped through a POS terminal. Embodiments are not limited to a specific location as long as they are in accordance with the appropriate standard, e.g., International Organization for Standardization (ISO)/International Electrotechnical Commission (IEC) 14443 and ISO/IEC 7810.

FIG. 3A illustrates one possible sequence flow where at least a portion of a transaction card 106 is extended from the upper edge of a user device 100. In the illustrated example, the user device 100 may be the same as user device 100 of FIG. 1.

As mentioned, the user device 100 may include memory and circuitry, such as substrate controller circuitry, to process one or more instructions executed on the user device 100, e.g., initiated by an application, an operating system, or other executable code/instructions. In one example, the application may be banking application, such as CAPITAL ONE's ENO application, a payment application, such as a PAYPAL's application, APPLE's payment application, GOOGLE's payment application, and the like.

The application may enable a user to perform one or more transaction via one or more methods at a physical location (POS terminal), e.g., NFC communication, Bluetooth communication, IEEE 802.11 communication, and via a physical transaction card 106 coupled with the user device 102. The application may enable a user to perform one or more operations to perform the transaction, e.g., select a transaction card, change settings for transaction cards, add/delete/manage transaction cards, set a default transaction card, and so forth. For example, the application may include instructions to the presentation of one or more displays in a GUI on the display 102 of the user device 100. A user may interact and/or send one or more inputs with the application via one or more input devices, a touchscreen interface of the display 102, one or more buttons, a camera, a microphone, and so forth.

In embodiments, the application may cause the physical transaction card 106 to extend from an edge of the user device 100 based on an event. Note that the physical transaction card 106 may be an 'entire' transaction card as defined in ISO/IEC 7810. However, in other instances, only a portion of the transaction card may be present and extend from the edge of the user device 100, e.g., an amount required for use in a POS terminal.

As previously discussed, the application may enable a user to pay for a transaction via a wireless technique, such as NFC communication. However, in some instances, the transaction attempt via the wireless technique may fail. Thus, the application may detect the failure, e.g., receive a failure communication from the POS terminal, which may be set as an event to cause the transaction card 106 extend from the edge of the user device 102. The portion of the transaction card 106 may be used as a backup or secondary payment device in this example.

In some instances, a user may desire to use the transaction card 106 primarily, e.g., without first performing the payment wirelessly. The physical transaction card 106 may provide more security such that a fraudster may not steal account information via the wireless signals, for example. The user may cause an event that may be detected by the application to cause the transaction card 106 to extend from an edge of the user device 100. The event may be an interaction with an input device of the user device 100, e.g., pushing of a button, shaking of the device, interaction with the touchscreen interface, and so forth.

In the illustrated example of FIG. 3A, the application may present a graphical representation 104 of the transaction card that may be used for a transaction in a GUI on the display device 102. The user may use the touchscreen interface to select or 'grab' the graphical representation 104 and make a swipe or sliding motion. The touchscreen interface may send one or more communication or signals to the application, via the operating system, indicating the detected input. The application may determine the detected input is an event to cause the transaction card 106 to extend from an edge of the user device 100. The application may send one or more signals, via the operating system, to a device, such as electromechanical, to cause the transaction card 106 to extend from the edge of the user device 100.

In FIG. 3A, at 302, a user may make a swipe input in the upward direction, e.g., from a bottom portion of the display 102 towards a top portion of the display 102. The touchscreen interface may detect the input and communicate an indication of the input to the application. The application may then cause the transaction card 106 to extend from the top edge of the user device 100 as illustrated in FIG. 3A. Note that although not illustrated, a user may make the opposite direction to cause the transaction card 106 to retract from the edge, e.g., from top to bottom of the display 102.

FIG. 3B illustrates another sequence flow where a user may utilize the touchscreen interface to generate an event to cause a transaction card 206 to extend from an edge of the user device 200. The user device 200 may display on the display 202 a graphical representation 204 of the transaction card 206. At 304, the user may make a swipe input in a sideways direction, e.g., from left to right on the display 202. The touchscreen interface may detect the input and communicate an indication of the input to the application. The application may then cause the transaction card 206 to extend from the right edge of the user device 100 as illustrated in FIG. 3B.

Similarly, the user may make a left-to-right sideways swipe input to retract the transaction card 206 into the user device 200. In the illustrated example in FIG. 3B, the transaction card 206 and graphical representation 204 may be oriented with the long ways of the card on in the horizontal direction. However, embodiments are not limited in this manner.

FIG. 3C illustrates another example sequence flow where a user may utilize the touchscreen interface to generate an event to cause a transaction card 206 to extend from an edge of the user device 200. This example is the same as the example in FIG. 3B, however, the transaction card 206 and graphical representation 204 may be oriented such that the longways is vertical on the display and when extended from the user device 200. Similarly, the user may make a sideways input at 306 on the touchscreen interface, and the transaction card 206 may extend from the right edge of the user device 200.

The examples illustrated in FIGS. 1-3C includes a user device and a transaction card extended from an edge of the user device in a particular direction and orientation. However, embodiments are not limited to the illustrated example. For example, the transaction card may extend from the bottom edge of the user device, or the left edge of the user device. Moreover, the examples include using a swipe touch input in the same direction of the action to be performed. However, embodiments are also not limited in this manner. In one example, the user swipe in an opposing direction to cause the transaction card to extend from an edge of the user device. Moreover, the user may utilize different inputs than a swipe input to cause extension and retraction of the transaction card, e.g., a button press input, touching an area of the touchscreen interface, a voice command, a visual command, swipe direction in any direction, and so forth. Embodiments are not limited in this area.

FIG. 4 illustrates an example of a first logic flow 400 to enable a physical transaction on a user or mobile device. In the illustrated example, the logic flow 400 includes extending and retracting a transaction card from an edge of a housing based on events. FIG. 4 illustrates an example of a logic flow 400 that may be representative of some or all of the operations executed by one or more embodiments described herein.

At block 405, the logic flow 400 includes detecting an event to extend a substrate from an edge of a housing of a user device. For example, circuitry executing one or more instructions may detect an event, such as a failure to complete a transaction via a wireless method, or a user input on a touchscreen interface. The circuitry executing the instructions may determine the event is to extend the substrate of a transaction card from an edge of the user device based on the event.

In some instances, at optional block 410, the logic flow 400 may include determining the substrate is retracted from the housing of the user device. In other words, the circuitry may determine that the substrate is not already extended and; therefore, does not need to cause any further action to extend it. The determination may be an indication from a device, such an electromechanical device, indicating the position/state of the substrate, e.g., extended or retracted. Note that in some instances, the circuitry may not perform this operation, but may assume and/or already be aware that the substrate is retracted, e.g., from a previous operation.

At block 415, the logic flow 400 includes causing the substrate to extend from the edge of the housing. For example, the circuitry executing the instructions may send one or more instructions that may be processed by the operating system that may further cause signals to be communicated to a device, such as the electromechanical device, to cause the device to extend the substrate from the edge of the housing. The edge from which the substrate is extended may be the configuration of the user device and the transaction card coupled with the user device.

At block 420, the logic flow 400 includes detecting another event to retract the substrate from the edge of the housing of the user device. For example, the circuitry executing the instructions may receive an indication of an event, such as user input via an input device/touchscreen interface, or completion of a transaction, and determine to retract the substrate from the edge based on the event.

At block 425, the logic flow 400 includes causing retraction of the substrate from the edge of that the substrate is within the housing. For example, the circuitry executing the instructions may communicate with the operating system to cause the operating to send one or more signals to a device, such as the electromechanical device, to cause the device to retract the substrate. The substrate may be located within a slot and/or recess of the housing when it is in the retracted position.

FIG. 5 illustrates an example of a second logic flow 500 to enable a physical transaction card of a user device for use to perform a transaction. FIG. 5 illustrates an example of a logic flow 500 that may be representative of some or all of the operations executed by one or more embodiments described herein.

At block 505, the logic flow 500 includes determining to extend a substrate from an edge of a housing of user device based on a detection of an event, the substrate comprising a magnetic stripe having information for an account for the performance of a transaction, and the substrate coupled with the housing. For example, circuitry executing instructions may detect and/or receive an indication of the event and determine to extend a transaction card or portion thereof including the substrate from an edge of a user device, such as a mobile device. The substrate may include one or more components, such as a magnetic stripe and/or an EMV chip that may be programmed with account information to perform a transaction.

In some instances, the circuitry executing the instructions may determine the information of the account and programming the one or more components, including the magnetic stripe. For example, the circuitry may determine a user select information associated with an account, e.g., selecting a particular transaction card, retrieve the information from a secure memory of the user device, and cause a device, such as magnetic stripe writer, of the user device to write the information to the magnetic stripe prior and/or during extending of the substrate. For example, the circuitry may cause the information to communicate, via the operating system, to the device, and the device may write to the magnetic stripe the information. A similar operation may be performed for an EMC chip writing. The user device may include an EMV writer and receive information from the circuitry of the account and write the information into the EMV chip prior to extended in the substrate, e.g., by communicating the information, via the operating system, to the EMV writer, which may in turn write the information to the EMV chip through contact pads of both the user device and the substrate.

At block 510, the logic flow 500 includes determining whether the substrate is retracted from the edge of the housing or extended from the edge of the housing. Further and at block 515, the logic flow 500 includes, in response to determining the substrate is retracted from the edge of the housing, causing the substrate to extend from the edge of the housing based on the substrate determined to be retracted. However, at block 520, the logic flow 500 includes, in response to determining the substrate is extended from the edge of the housing, maintaining the substrate extended until the detection of another to retract the substrate.

At block 525, the logic flow 500 includes detecting another event to retract the substrate from the edge of the housing of the user device. Further and at block 530, the logic flow 500 includes causing retraction of the substrate from the edge of the housing such that the substrate is within the housing.

FIG. 6 illustrates an example of a mobile device 600, such as a user device discussed in FIGS. 1-5. Reference now is made in detail to the examples illustrated in the accompanying drawings and discussed below. FIG. 6 illustrates a mobile device 600, including a number of components.

Further, the mobile device 600 may be configured to communicate in accordance with one or more wireless protocols, including NFC. For example, to provide data to or receive information from another mobile device or POS terminal. In an example process, the following operations may take place. At a high level, the user brings the NFC enabled mobile device 600 within proximity (e.g., 2 to 4 cm or less, although in some cases the distance may be up to 20 cm) of another NFC capable device. An application installed on the mobile device 600 listens for NFC events and commences a contactless data flow by establishing communication with the other NFC capable device. In embodiments, the mobile device 600 may utilize NFC to perform transactions with POS terminals, for example.

In the peer-to-peer mode of operation, the mobile device 600 initiates data exchange with another device (e.g., second NFC enabled mobile device). Such data exchange is defined in the ISO 18092 standard. Both devices play a symmetric role in that both may generate a magnetic field and transmit and receive data. A typical use case for P2P communication may be an exchange of the transaction card information.

Traditionally, such exchange is controlled by the host controller 612, without the involvement of a security function. However, embodiments may include an NFC controller 636 of the mobile device 600 to first determine whether a security function is required, e.g., cryptographic operations performed on the data for sending and receiving. If a security function is required, the payload, such as the transaction card information, is evaluated by a rule-set of a security element before routing the information in the payload to the host controller 612 and communicating to the other device. The secure element may apply one or more encryption techniques prior to sending the data to the other device and NFC controller 636. Similarly, the secure element may apply one or more decryption techniques on data received from the other device. In some embodiments, the secure element may be implemented in secure circuitry.

It should be appreciated that the disclosed subject matter may be implemented using any mobile computing device having NFC communication capability and mobile communication capability, configured to use those capabilities to conduct mobile transactions, e.g., for data exchange, as discussed herein. In the example of FIG. 6, the mobile device 600 is in the form of a smart phone type mobile handset, including a touch screen display 620. Examples of touch screen type mobile devices that may be used to implement mobile device 600 may include (but are not limited to) a smart phone, personal digital assistant (PDA), tablet computer or another portable device with NFC capability. However, the structure and operation of the touch screen type mobile device 600 is provided by way of example; and the subject technology as described herein is not intended to be limited thereto. For purposes of this discussion, FIG. 6 provides a block diagram illustration of the exemplary mobile device 600 having a touch screen display 620 (touchscreen interface) for displaying content and receiving user input as (or as part of) the user interface, e.g., selecting a transaction card, selecting account settings, configuring a transaction card, causing extension and retraction of a transaction and so forth.

In embodiments, the mobile device 600, also supports voice communications. Hence, in the example shown in FIG. 6, the mobile device 600 includes a microphone 602 for audio signal input and a speaker 604 for audio signal output. The microphone 602 and speaker 604 are communicatively coupled to a voice or audio encoder/decoder (vocoder) 606. For a voice telephone call, for example, the vocoder 606 provides two-way conversion between analog audio signals representing speech or other audio and digital samples at a compressed bit rate compatible with the digital protocol of wireless telephone network communications or voice over packet (e.g., Internet Protocol) communications. The vocoder, speaker and microphone may also be used as elements of the user interface during other operations of the device, including some types of transaction communications and to cause the transaction card to extend and/or retract.

Also, as shown in FIG. 6, the mobile device 600 includes at least one digital transceiver (XCVR) 608, for digital wireless communications via a wide area wireless mobile communication network, although the mobile device 600 may include additional digital or analog transceivers (not shown). The transceiver 608 conforms to one or more of the various digital wireless communication standards utilized by modern mobile networks. Examples of such transceivers include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and 3GPP Long Term Evolution (LTE), at times referred to as "4G." For example, transceiver 608 provides two-way wireless communication of information including digitized audio signals, still image and/or video signals, web page information for display as well as web related inputs, and various types of mobile message communications to/from the mobile device 600.

In one example, the transceiver 608 also sends and receives a variety of signaling messages in support of various voice and data services provided by a network of a wireless service provider, to a user of mobile device 600 via the mobile communication network. Transceiver 608 connects through radio frequency (RF) send-and-receive amplifiers (not separately shown) to an antenna 609. Transceiver 608 may also support various types of mobile messaging services, such as short message service (SMS), enhanced messaging service (EMS), and/or multimedia messaging service (MMS). Although communications involving transaction card information obtained from the NFC enabled device typically utilize IP data transport, such transaction communications may at times utilize one or more of these mobile messaging services for the data transport through the mobile communication network.

Many modern mobile devices also support wireless local area network communications over WiFi, instead of or in addition to data communications using the wide area mobile communication network. Hence, in the example of FIG. 6, for packet data communications, the exemplary mobile device 600 may also include a WiFi transceiver 610 and associated antenna 611. Although WiFi is used here as the example, the transceiver 610 may take the form of any available two-way wireless local area network transceiver of a type that is compatible with one or more standard protocols of communication implemented in wireless local area networks, such as one of the WiFi standards under IEEE 802.11 and/or WiMAX. The transceiver 6110, for example, may provide two-way data transport for wireless communication with a wireless access point in a residence or enterprise that the user frequents or with any available hotspot offered in a public venue. Although communicating through a different network or networks, the transceiver 610 supports various types of data communications similar to the packet data communications supported via the mobile network transceiver 608, including communications related to shared transaction card data, the one or more restriction, involving data communicated with the NFC enabled device, and a server of a banking system.

The mobile device 600 further includes a microprocessor, sometimes referred to herein as the host processor 612, which serves as a programmable controller for mobile device 600 by configuring mobile device 600 to perform various operations, for example, in accordance with instructions or programming executable by processor 612. For example, such operations may include various general operations of the mobile device 600 as well as operations related performing transaction and extending/retracting a transaction card, as discussed herein.

A memory or storage 614 is used to store, for example, programming or instructions for execution by the processor 612. Depending on the type of device, the mobile device 600 stores and runs an operating system 640 through which specific applications may be run on the device. Examples of operating systems 640 include Android, Apple iOS (I-Phone or iPad devices), Windows Mobile, RIM BlackBerry operating system, or the like. Storage 614 may also be used to store mobile configuration settings for different mobile applications or services executable at mobile device 600 (using host controller 612), such as defaults/preset settings of a banking application, e.g., application(s) 642, modules 646, and data 646 (transaction card information). Mobile device 600 may also include a non-volatile random access memory (RAM) 616 for a working data processing memory.

In embodiments, the memory or storage 614 may include one or more secure memory locations to store the transaction card information. As discussed, the transaction card information may be retrieved by the host controller 612 and written to the physical transaction card by Magstripe R/W 650 and/or EMV R/W 648. Each transaction card information associated with a particular transaction card/account may be stored in a separate secure memory location and the controller 612 may access the location based on the selection made by a user via a GUI interface, for example.

Other storage devices or configurations may be added to or substituted for those in the example. Such other storage devices may be implemented using any type of storage medium having computer or processor readable instructions or programming stored therein and may include, for example, any or all of the tangible memory of the computers, processors or the like, or associated modules. The instructions or programming may be used to implement the interaction with another device and/or server, as described herein. Program aspects of the technology may be thought of as "products" or "articles of manufacture" typically in the form of executable code or process instructions and/or associated data that is stored on or embodied in a type of machine or processor readable medium.

A mobile device supporting read/write, P2P, and card emulation and related data communications of the type under consideration here, may include a variety of different types of user interface elements. For discussion purposes, in the smart phone example shown in FIG. 6, the user interface elements of mobile device 600 include a touch screen display 620 (also referred to herein as "touch screen" or "display" or "touchscreen interface"). For output purposes, the touch screen 620 includes a display screen, such as a liquid crystal display (LCD) or the like. For input purposes, touch screen display 620 includes a plurality of touch sensors 622. Other interface elements may include a keypad including one or more keys 630. For example, the keypad may be implemented in hardware as a T9 or QWERTY keyboard of mobile device 600 and keys 630 may correspond to the physical keys of such a keyboard. Alternatively, keys 630 (and keyboard) of mobile device 600 may be implemented as "soft keys" of a virtual keyboard graphically represented in an appropriate arrangement via touch screen display 620. The soft keys presented on the touch screen display 620 may allow the user of mobile device 600 to invoke the same user interface functions as with the physical hardware keys. In some implementations, the microphone 602 and speaker 604 may be used as additional user interface elements, for audio input and output, including with respect to some functions related to the transaction processing and communication, as described herein.

For output, touch screen display 620 is used to present information (e.g., text, video, graphics or other visible content) to the user of mobile device 600, e.g., interact with a banking application. Host processor 612 controls visible display output on the LCD or another display element of the touch screen display 620 via a display driver 624, to present the various visible outputs to the device user. For example, some of the transaction-related programming may cause the processor 612 to operate the driver 624 to cause screen 620 to display visible information about sharing transaction card information, causing extension/retraction of a transaction card, and so forth.

In general, touch screen display 620 and touch sensors 622 (and one or more keys 630, if included) are used to provide the textual and graphical user interface for the mobile device 600. In an example, touch screen display 620 provides viewable content to the user at mobile device 600. Touch screen display 620 also enables the user to interact directly with the viewable content provided in the content display area, typically by touching the surface of the screen with a finger or an implement such as a stylus.

As shown in FIG. 6, the mobile device 600 also includes a sense circuit 626 coupled to touch sensors 622 for detecting the occurrence and relative location/position of each touch with respect to a content display area of touch screen display 620. In this example, sense circuit 626 is configured to provide host controller 612 with touch-position information based on user input received via touch sensors 622, which may be further provided to an operating system and application running on the operating systems. In some implementations, host controller 612 is configured to correlate the touch position information to specific content being displayed within the content display area on touch screen display 620. The touch-position information captured by sense circuit 626 and provided to host controller 612 may include, but is not limited to, coordinates identifying the location of each detected touch with respect to the display area of touch screen display 620 and a timestamp corresponding to each detected touch position, e.g., a swipe input.

The user interface capabilities of the mobile device 600 provide output to and receive input from the user of the mobile device 600, for any of the various functions, operations or applications of the device. For example, programming (discussed herein) that causes the mobile device 600 to obtain and act on information to communicate with another device to share transaction card information and extend/retract a transaction card.

The mobile device 600 location determining devices. In our example, the mobile device 600 includes a global positioning satellite (GPS) receiver 632 and associated antenna 634. GPS is a space-based satellite navigation system that provides location and time information anywhere on Earth, where there is an unobstructed line of sight to at least three or more of the GPS satellites.

In embodiments, the mobile device 600 may include one or more other components to enable a user to utilize a transaction card coupled and/or stored within the mobile 600. For example, the mobile device 600 may include a substrate device 637 to cause the transaction card to extend and retract from an edge of the housing of the mobile device 600. As discussed, the substrate device 637 may be an electrical device, a mechanical device, or an electromechanical device and include, but is not limited, a motor, a switch, an actuator, a servomechanism, a positioning device, electronics, a controller, a solenoid, and so forth. Further, the substrate device 637 may one or more instructions or signals from other components of the mobile device 600, such as the host controller 600, to cause the transaction card to extend and retract from the mobile device 600. The instructions and signals may be received over one or more buses, traces, and/or connectors coupling the host controller 612 with the substrate device 637.

The mobile device 600 may also include one or more devices to read and write information to the transaction card to enable the transaction card to be updated with different account information to perform transactions. For example, the mobile device 600 may include a magstripe read and writer 650 that may be coupled with the host controller 612. The magstripe reader and writer 6500 includes components capable of writing to and reading from the magnetic stripe of the transaction card. In one example, the magstripe read and writer 650 may receive account information, including an account number, a username, an expiration date, issuing banking information (routing information), and so forth from the host controller 612 and write the account information to the magnetic stripe of the transaction car to be used for a transaction. In embodiments, the magstripe reader and writer 650 may be located within the mobile device 600 such that it is capable of reading and writing to the transaction card when the transaction card is retracted, e.g., physically touch and/or within a defined read/write distance.

Similarly, the mobile device 600 may include an EMV reader and writer 648. The EMV reader and writer 648 may also receive account information to write to an EMV chip of the transaction card to perform transactions. In embodiments, the EMV reader and writer 648 may include a contact pads that may couple with the contact pads of the transaction card when the transaction card is retracted. The EMV reader and write may read and write to the EMV chip of the transaction card in accordance with the EMV protocol.

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose and may be selectively activated or reconfigured by a computer program stored in the computer. The procedures presented herein are not inherently related to a particular computer or other apparatus. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A user device, comprising:
   a near-field communication (NFC) device configured to detect NFC devices to perform transactions;
   a housing comprising a front portion, a back portion, and edges to couple the front portion with the back portion;
   a substrate coupled with the housing, the substrate comprising a magnetic stripe, and the magnetic stripe programmable to store information associated with at least one account of a plurality of accounts;
   substrate controller circuitry located within the housing and coupled with the substrate, the substrate controller circuitry operable to execute instructions to control the substrate, the substrate controller circuitry, when executing the instruction, to:
      detect an event to cause at least a portion of the substrate to extend from an edge of the housing, wherein the portion of the substrate comprises the magnetic stripe, wherein the event comprises a failed attempt to perform a transaction via the NFC device with one of the NFC devices;
      detect a touch input via a touchscreen display, and the touch input comprises a swipe in a direction toward the edge from which the portion of the substrate extends;
      determine a rate of the swipe of the touch input; and
      in response to the event, automatically cause the portion of the substrate to extend from the edge of the housing at a second rate proportional to the rate of the touch input.

2. The user device of claim 1, comprising the touchscreen display configured to receive the touch input.

3. The user device of claim 1, wherein the substrate controller circuitry to determine the rate of the touch input based on data received from the touchscreen display.

4. The user device of claim 1, comprising the touchscreen display, the touchscreen display configured to display a graphical user interface (GUI) to receive touch inputs including the touch input and present a graphical representation of a portion of a transaction card, wherein the portion of the transaction card represents a remaining portion of the substrate not extended from the edge.

5. A user device of claim 1, wherein the other NFC devices are comprised in one of a point of sale (POS) terminal, an automatic teller machine (ATM), and the user device.

6. The user device of claim 1, wherein the edge from which the portion of the substrate is extended is a top portion of the housing or a side portion of the housing, and the portion of the substrate is located within the housing when retracted.

7. The user device of claim 1, the substrate controller circuitry to detect another event and retract the portion of the substrate extended from the edge of the housing, the another event comprising one or more of an expiration of timer, a swipe touch event from the extended edge towards an opposing edge, and an indication of a completion of a transaction.

8. The user device of claim 1, the substrate comprising an EMV chip located on an opposing side of the magnetic stripe, the EMV chip programmable to store at least one account of the plurality of account.

9. The user device of claim 8, wherein the account programmed on the EMV chip and the account programmed on the magnetic stripe are different.

10. A computer-implemented method, comprising:
   detecting, by substrate controller circuitry, an event to cause at least a portion of a substrate to extend from an edge of a housing, wherein the portion of the substrate comprises a magnetic stripe programmable to store information associated with a banking account of a plurality of banking accounts, wherein the event comprises a failed attempt to perform a transaction via an NFC device with another NFC device;
   detecting, by the substrate controller circuitry, a touch input via a touchscreen display, and the touch input comprises a swipe in a direction toward the edge from which the portion of the substrate extends;

determining a rate of the swipe of the touch input; and in response to the event, automatically causing the portion of the substrate to extend from the edge of the housing at a second rate proportional to the rate of the swipe.

11. The computer-implemented method of claim 10, wherein the determining the rate of the swipe is based on data received from the touchscreen display.

12. The computer-implemented method of claim 10, comprising displaying, by the touchscreen display, a graphical user interface (GUI) to present a graphical representation of a portion of a transaction card, wherein the portion of the transaction card represents a remaining portion of the substrate not extended from the edge.

13. The computer-implemented method of claim 10, wherein the edge from which the portion of the substrate is extended is a top portion of the housing or a side portion of the housing, and the portion of the substrate is located within the housing when retracted.

14. The computer-implemented method of claim 10, comprising:

detecting, by the substrate controller circuitry, another event; and in response to the detection of the another event, causing, by the substrate controller circuitry, the portion of the substrate extended from the edge of the house to, the another event comprising one or more of an expiration of timer, a swipe touch event from the extended edge towards an opposing edge, and an indication of a completion of a transaction.

15. The computer-implemented method of claim 14, wherein the substrate comprises an EMV chip located on an opposing side of the magnetic stripe, the EMV chip programmable to store information associated with one of the plurality of banking accounts.

16. The computer-implemented method of claim 15, wherein information programmed on the EMV chip and the information programmed on the magnetic stripe are for different banking accounts.

17. A non-transitory computer-readable storage medium storing computer-readable program code executable by substrate controller circuitry, to:

detect an event to cause at least a portion of a substrate to extend from an edge of a housing, wherein the portion of the substrate comprises a magnetic stripe programmable to store information associated with a banking account of a plurality of banking accounts, wherein the event comprises a failed attempt to perform a transaction via an NFC device with another NFC device;

detect a touch input via a touchscreen display, and the touch input comprises a swipe in a direction toward the edge from which the portion of the substrate extends;

determine a rate of the swipe of the touch input; and in response to the event, automatically cause the portion of the substrate to extend from the edge of the housing at a second rate proportional to the rate of the swipe.

18. The non-transitory computer-readable storage medium of claim 10, wherein the determining the rate of the swipe is based on data received from the touchscreen display.

19. The non-transitory computer-readable storage medium of claim 10, storing computer-readable program code executable by a processor to cause displaying, by the touchscreen display, a graphical user interface (GUI) to present a graphical representation of a portion of a transaction card associated with the banking account, wherein the portion of the transaction card represents a remaining portion of the substrate not extended from the edge.

20. The non-transitory computer-readable storage medium of claim 10, storing computer-readable program code executable by the substrate controller circuitry to:

detect another event; and in response to the detection of the another event, cause the portion of the substrate extended from the edge of the house to, the another event comprising one or more of an expiration of timer, a swipe touch event from the extended edge towards an opposing edge, and an indication of a completion of a transaction.

* * * * *